Figure 4:
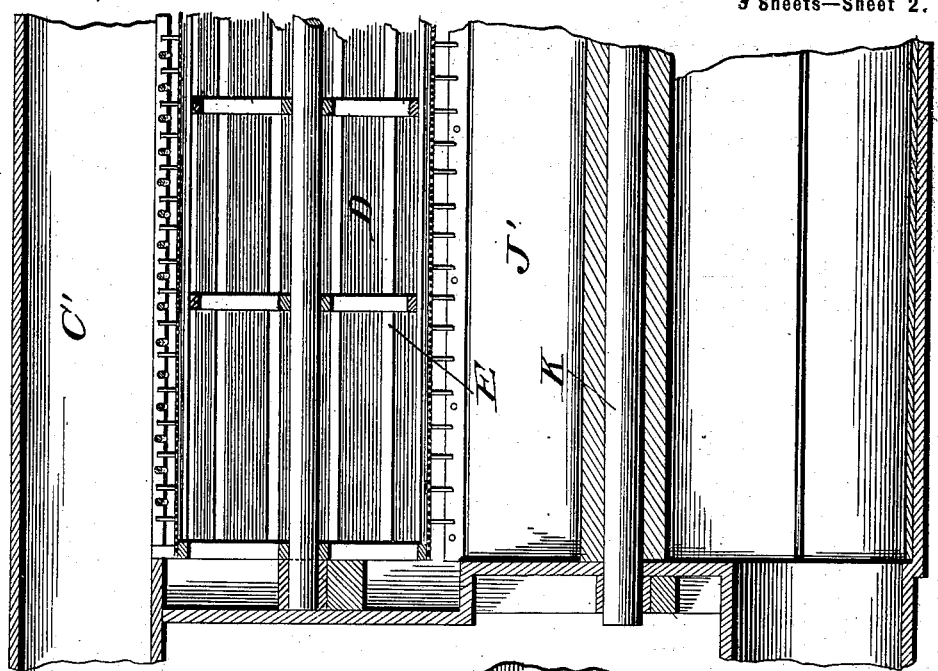

No. 651,986. Patented June 19, 1900.
E. E. BATEMAN.
COTTON SEPARATOR, DISTRIBUTER, AND FEEDER.
(Application filed Mar. 6, 1900.)
(No Model.) 3 Sheets—Sheet 1.
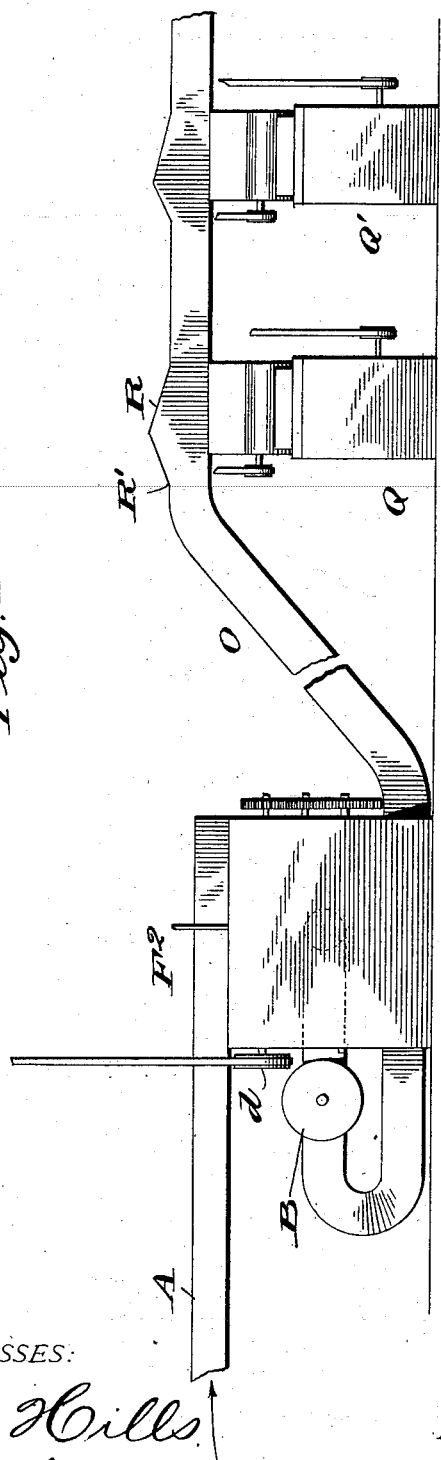
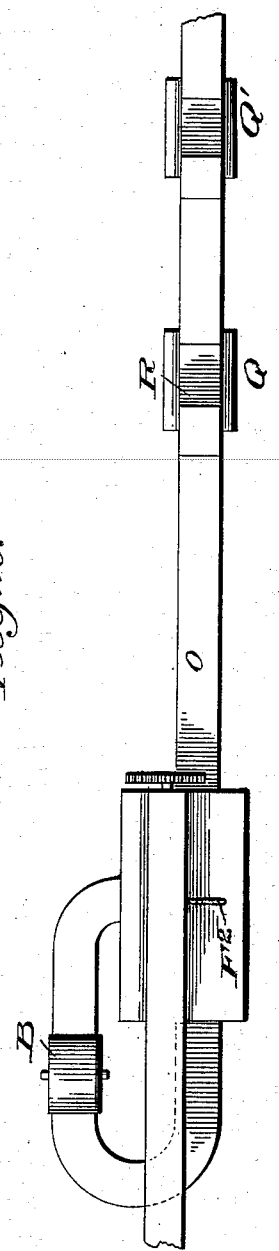
WITNESSES:
L. C. Hills
A. L. Hough
INVENTOR
Eugene E. Bateman,
By Franklin N. Hough
Attorney
THE NORRIS PETERS CO., PHOTO-LITHO., WASHINGTON, D. C.

No. 651,986. Patented June 19, 1900.
E. E. BATEMAN.
COTTON SEPARATOR, DISTRIBUTER, AND FEEDER.
(Application filed Mar. 6, 1900.)
(No Model.) 3 Sheets—Sheet 2.

WITNESSES:
L. C. Hills
A. L. Hough

INVENTOR
Eugene E. Bateman,
BY Franklin H. Hough
Attorney

No. 651,986. Patented June 19, 1900.
E. E. BATEMAN.
COTTON SEPARATOR, DISTRIBUTER, AND FEEDER.
(Application filed Mar. 6, 1900.)
(No Model.) 3 Sheets—Sheet 3.
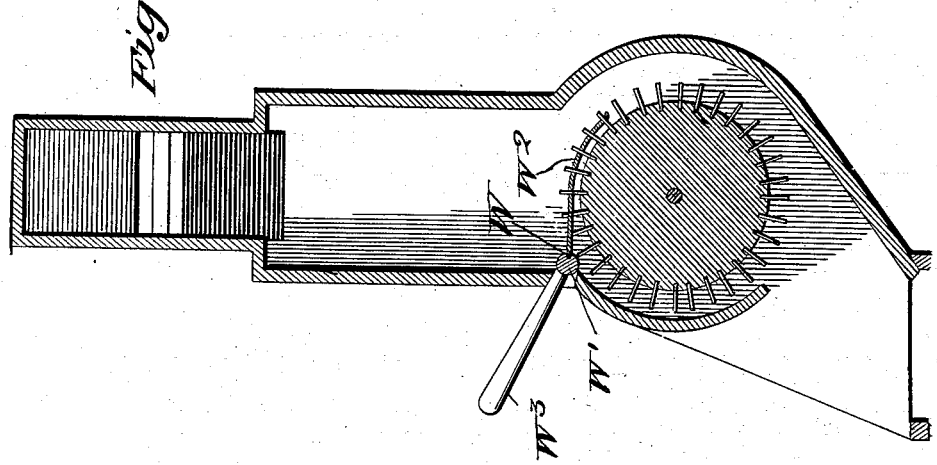
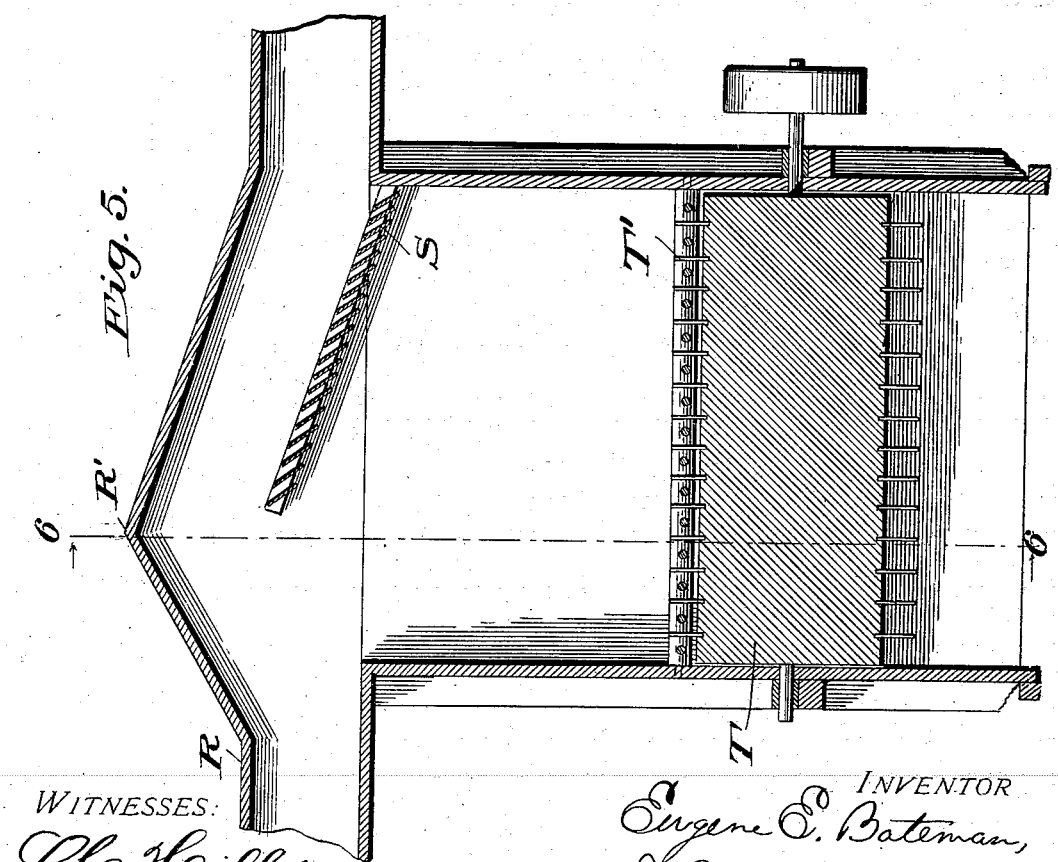
WITNESSES:
L. C. Hills.
C. L. Hoyt.
INVENTOR
Eugene E. Bateman,
BY Franklin H. Hough
Attorney
THE NORRIS PETERS CO., PHOTO-LITHO., WASHINGTON, D. C.

UNITED STATES PATENT OFFICE.

EUGENE E. BATEMAN, OF MARQUEZ, TEXAS.

COTTON SEPARATOR, DISTRIBUTER, AND FEEDER.

SPECIFICATION forming part of Letters Patent No. 651,986, dated June 19, 1900.

Application filed March 6, 1900. Serial No. 7,565. (No model.)

*To all whom it may concern:*

Be it known that I, EUGENE E. BATEMAN, a citizen of the United States, residing at Marquez, in the county of Leon and State of Texas, have invented certain new and useful Improvements in Cotton Separators, Distributers, and Feeders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cotton conveyers and distributers in which the said cotton is drawn by pneumatic suction into and through a trough or passage-way to a distributer box or compartment which has disposed across its upper portion an adjustable rack, between the teeth of which rack the spikes mounted on the circumference of a rotary cylinder are adapted to turn for the purpose of clearing the rack of the cotton falling thereon and conveying the same to and depositing the cotton into a suitable compartment, from which the cotton falls into a rotary compartment-wheel, from which compartments the cotton is deposited into a trough, from which it is conveyed by a current of air, which blows the cotton through a suitable trough to the battery of gins.

Another feature of the invention resides in the provision of means in connection with the conveyer passage-way over the battery of gins whereby the cotton after a certain quantity is fed to the first of the gins of the battery may be carried forward into the feeding passage-way by means of the pneumatic current to the successive gins, suitable slatted members being provided, one above each gin and extending into the conveyer passage-way, so disposed as to allow the air to pass through between the slats, but prevent the cotton passing through the same, thereby allowing the current of air a comparatively-uninterrupted passage-way.

My invention will be clearly understood when taken in connection with the drawings forming part of this application, in which drawings I have shown, in—

Figure 3:
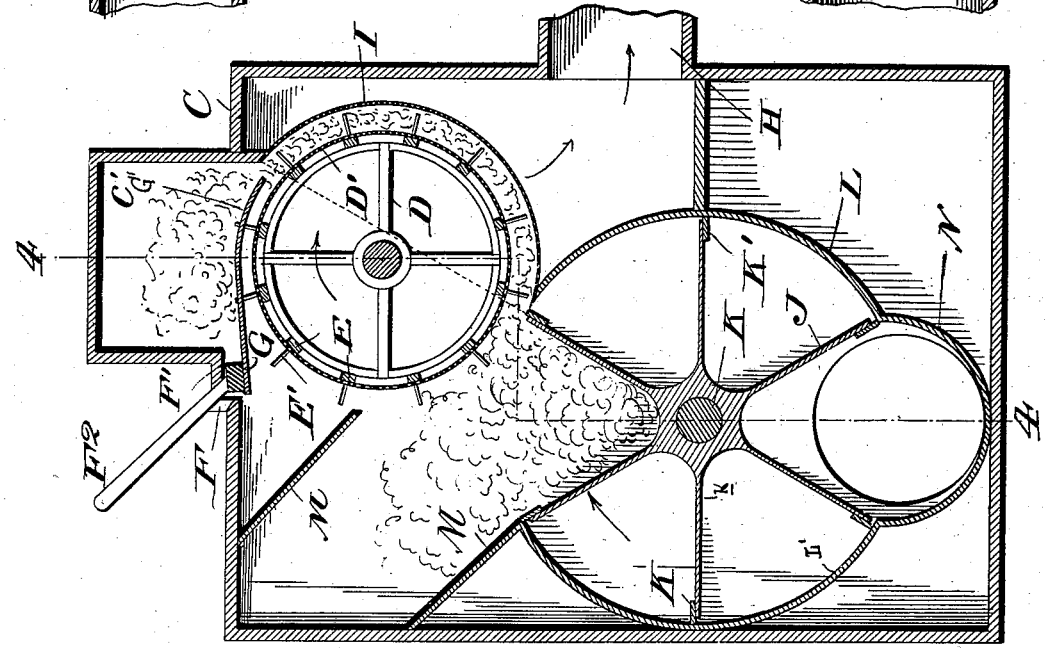

Figure 1, a diagrammatic view showing the course of the pneumatic current to and through the separator and thence through the conveyer to the battery of gins; Fig. 2, a top diagrammatic view of the conveyer passage-way; Fig. 3, a vertical sectional view transversely through the separator-compartment and cylinders; Fig. 4, a vertical sectional view on line 4 4 of Fig. 3; Fig. 5, a vertical central longitudinal view through a cotton-gin and conveyer passage-way above the same, and in Fig. 6, a central sectional view vertically on line 6 6 of Fig. 5.

Reference now being had to the details of the drawings by letter, A designates the pneumatic-feeding passage-way, into which the cotton is drawn by suction from a fan-wheel B, which has an air-tight passage-way leading to and communicating with said feeding-trough, and at any suitable location is a separator-compartment C, with which said feeding passage-way communicates at the upper end of the separator-compartment. Journaled in the opposite walls of said separator-compartment is a cylindrical drum D, which has a wire-gauze D' about its circumference and has a series of longitudinal bars E, in which are securely fastened the spikes E', said spikes being arranged at given distances apart on each of the bars. Mounted on a rock-shaft F, which is journaled in the opposite walls of the separator-compartment in an offset F', is a rack G, having a series of rack-teeth G', which are preferably slightly curved at their free ends and adapted to normally rest over the cylinder in such position that the spikes E', mounted on the circumference of the cylinder D, will enter the spaces between said teeth of the rack as the cylinder rotates for the purpose of clearing the cotton which rests upon the rack and drawing it off from the free ends of the teeth. Secured to said rock-shaft F is a lever F², whereby said rack may be raised or lowered, accordingly as it may be desired to prevent the cotton being fed or allowing the same to be drawn off the ends of the teeth of the rack as the cylinder rotates. By adjusting the rack at different heights the quantity of cotton to be fed may be regulated. Said separator-compartment is provided with air-tight walls, through which the feeding passage-way enters at the top, as described, and at a location preferably at the rear of said separator-compartment a suction passage-way H leads from the separator-compartment, and through which the air is drawn which conveys the cotton to the upper portion of the separator, said air being allowed to pass through the perforated cylinder and into said passage-way H, leading to the fan-wheel. I is a curved partition made, preferably, of wire, through which the air is drawn, coming from the feeding passage-way and passing through the cylindrical drum.

At any suitable location within the separator, preferably beneath and slightly at one side of the separator-compartment, is mounted a shaft K, on which a cylindrical compartment-cylinder J is mounted, said cylinder having a series of compartments J', which are open at their outer margins and provided with flaps K' on each wing k, dividing the cylinder into compartments. The outer ends of said wings k, having flaps at their ends, rotate so that said flaps will come adjacent to the ends of the spikes carried by the rotary cylinder D. Air-tight concaved walls L and L' are formed in the separator-compartment, extending longitudinally of the same, and adjacent to the concaved portion of said walls the partitions or wings k of said cylinder rotate, said flaps K' contacting with said curved surface as the cylinder rotates.

M M indicate diagonally-disposed partitions which extend longitudinally through the separator-compartment, the free end of the upper of said partitions being adjacent to the circumference of the rotary spike-carrying cylinder D, while the free end of the lower of said partitions is held adjacent to the outer rotating edges of the partitions of the compartment-cylinder, thus forming a receptacle into which the cotton is thrown by centrifugal force from the cylinder D, while the current of air which is drawn by suction through the cylinder D passes through the perforated cylinder and the wire partition I and into the passage-way H, leading to the fan. The current of air being thus drawn through the cylinder and said wire partition, the cotton falls by gravity from the receiving-compartment between said inclined partitions into the compartments of the drum J as the latter rotates. As a compartment of said drum passes by the upper end of the concaved partition L the cotton contained in said compartment is cut off from the influence of the current of air, and when each compartment passes the lower end of the partition L the cotton contained in the compartments falls by gravity into a trough N at the lowest portion of the separator-compartment. Leading into the lower end of the separator-compartment in line with said trough N is one end of the passage-way H, in which passage-way the fan B is located, the entrance to said passage-way H being adjacent to the curved portion I and in the rear wall of the separator-compartment, the current of air being drawn into the inlet of said passage-way and forced or drawn out of the passage-way at its opposite end through the trough N and carrying with it the cotton which falls by gravity into said trough and blowing the cotton from the trough into the conveyer O, through which it is carried to the battery of gins.

In the drawings I have shown two gin-feeders Q and Q', communication being had with each through said conveyer O. The upper wall of said conveyer at locations over the gin-feeders is inclined upward at points R, and thence at the points R' is downwardly inclined, and over which feeders is disposed a slatted rack S, which is secured to the inner wall of the casing of the gin-feeder and is slightly inclined, with its free end extending into the conveyer, as is clearly shown in Fig. 5 of the drawings. The gin-feeder roller T, which is journaled in the opposite ends of the feeder-casing, has a series of spikes T' about its circumference, and a rack W, similar to the rack hereinbefore described as used in connection with the separator, is provided, which rack is mounted on a shaft W' and has a series of curved rack-teeth W², between which the spikes of said cylinder T are adapted to rotate toward the free ends of said teeth, whereby the cotton falling upon the rack may be drawn off the rack by said spikes. Connected to the shaft W' is a lever W³, whereby the rack may be raised and lowered, as may be desired, for the purpose of allowing cotton to be fed through or regulating the feed.

For driving the separator-cylinder D a pulley d is mounted on one end of the shaft on which said cylinder is keyed, and the rotary compartment-cylinder mounted on the shaft K is driven by means of the sprocket chain and wheel connections with the shaft on which the separator-cylinder is mounted.

The operation of my invention will be at once understood when considered in connection with the foregoing, accompanied by the drawings forming part of this application, and is as follows: The cotton being sucked into the passage-way A by means of the fan is drawn through and into the upper end of the separator-compartment and deposited on the rack mounted at the upper end thereof. If said rack is at its lowest limit, the spikes on the rotary cylinder will draw the cotton off the rack at the outer end thereof and carrying the cotton over the concave wire portion will throw the cotton by centrifugal force into the space between the inclined partitions M in the separator-chamber, and the current of air which draws the cotton into the separator will be sucked through the cylinder and wire partition and into the passage-way H. The cotton falling from the receiving-compartment into the compartments of the rotary cylinder will be conveyed as said compartment-cylinder rotates to the trough N, into which the cotton falls and from which trough the cotton is blown by the pneumatic current coming from the fan into the conveyer. The cotton after entering the conveyer is carried by the current up to and over the feeders. As the space beneath the slatted rack S of the first feeder becomes filled the cotton will be carried farther along to the next feeder, the air which carries the cotton to the first feeder passing up through the spaces between the slats of said rack S and about the end thereof. By means of adjusting the toothed rack held adjacent to the rotary spike-cylinder of the feeder the feeding of the cotton may be easily regulated.

What I claim is—

1. A cotton conveyer and separator, in which cotton is drawn by a pneumatic current through a passage-way and into a separator-compartment, a rotary separator-drum having a perforated circumference, an adjustable toothed rack mounted in the separator-compartment between said drum and the exit end of said passage-way, a compartment-wheel and means for drawing a current of air into the separator-compartment, as set forth.

2. A cotton conveyer and separator, a passage-way in which cotton is drawn by a pneumatic current, a separator-compartment communicating with said passage-way, a cylinder with spiked circumference which is perforated, mounted in said compartment, an adjustable rocking toothed rack disposed between said cylinder and the exit end of said passage-way, the spikes of the cylinder adapted to pass between the teeth of the rack and draw the cotton off the free ends of the teeth of the rack, the compartment-wheel and stationary partition-walls on opposite sides of said wheel, with a space intervening between the upper ends of said walls, and means for drawing a current of air into said separator-chamber, as set forth.

3. A cotton conveyer and separator, a passage-way and means for drawing cotton through same, a separator-compartment into which said passage-way communicates, an adjustable rocking toothed rack, a rotary spiked separator-cylinder having perforated circumference, said spikes adapted to draw the cotton off the ends of the teeth of said rack, and a compartment-cylinder for receiving the cotton from the separator-cylinder and depositing same into a trough from which a current conveys the cotton to cotton-gins, oppositely-disposed partition-walls between said trough and chamber in which the separator-cylinder rotates, the compartments of said wheel being separated from the influence of the pneumatic current, while the free ends of the division-walls of the compartment-wheel rotate adjacent to said partition-walls, as set forth.

4. In a cotton conveyer and separator, a passage-way in which cotton is drawn by pneumatic currents, a separator-compartment with which said passage-way communicates, a rotary spiked separator-cylinder, an adjustable rocking rack with curved teeth thereon between which teeth the spikes of the cylinder turn toward the ends of said teeth, a concaved wire partition about a portion of said separator-cylinder, a rotary compartment-wheel mounted adjacent to the separator-wheel, and designed to receive the cotton from the separator-cylinder, a trough for receiving the cotton from the compartment-wheel, a conveyer leading from said trough to cotton-feeders, and means for blowing the cotton through said conveyer, as set forth.

5. In combination, with the separator-compartment the adjustable rack having teeth thereon, the passage-way communicating with said compartment, and through which a pneumatic current is drawn, a rotary separator-cylinder having a perforated circumference and provided with spikes which rotate between the teeth of the rack and draw the cotton off the ends of said teeth, a concaved wire partition adjacent to said cylinder, a conveyer leading from the separator-compartment, a compartment-cylinder, adjacent to said separator-cylinder, a concaved wall about portions of said compartment-cylinder, a trough beneath the latter, the wings of the compartment-cylinder having flaps which contact with said concaved walls, the partitions M, and the conveyer leading from one end of the trough, whereby the current which draws cotton into the separator-compartment will blow the cotton to the gins, as set forth.

In testimony whereof I affix my signature in presence of two witnesses.

EUGENE E. BATEMAN.

Witnesses:
A. L. HOUGH,
FRANKLIN H. HOUGH.